US009189743B1

(12) United States Patent  
Teplitsky et al.

(10) Patent No.: US 9,189,743 B1  
(45) Date of Patent: Nov. 17, 2015

(54) SYSTEM, METHOD, AND COMPUTER PROGRAM PRODUCT FOR CONSTRAINT SOLVING

(71) Applicant: Cadence Design Systems, Inc., San Jose, CA (US)

(72) Inventors: Marat Teplitsky, Kfar-Saba (IL); Efrat Gavish, Tel Aviv (IL); Kalev Alpernas, Modiin (IL)

(73) Assignee: Cadence Design Systems, Inc., San Jose, CA (US)

( * ) Notice: Subject to any disclaimer, the term of this patent is extended or adjusted under 35 U.S.C. 154(b) by 252 days.

(21) Appl. No.: 13/666,614

(22) Filed: Nov. 1, 2012

(51) Int. Cl.  
 *G06N 5/00* (2006.01)  
 *G06N 5/04* (2006.01)

(52) U.S. Cl.  
 CPC ............... *G06N 5/048* (2013.01); *G06N 5/003* (2013.01)

(58) Field of Classification Search  
 CPC ..................................................... G06N 5/003  
 USPC ............................................................. 706/56  
 See application file for complete search history.

(56) References Cited

PUBLICATIONS

Guido Tack ("Constraint Propagation Models, Techniques, Implementation" 2009).*  
Roman Bartak ("Modelling Soft Constraints: A Survey" 2002).*  
Grandon et al ("Generalized Interval Projection: A New Technique for Consistent Domain Extension" 2007).*  
Van Hoeve, W. J., et al., "Decomposition Based Search: A Theoretical and Experimental Evaluation," Tepper School of Business, Paper 530. (Jan. 1, 2003), (http://repository.cmu.edu/tepper/530).  
Park, V., "An Empirical Study of Different Branching Strategies for Constraint Satisfaction Problems," Master Thesis, University of Waterloo, Waterloo, Ontario, Canada, (2004).  
Balafoutis, T., et al, "Adaptive Branching for Constraint Satisfaction Problems," http://users.uowm.gr/kstergiou/ECAI2010, (accessed on Jan. 28, 2013).  
Dincbas, M., et al., "Solving a Cutting-stock Problem in Constraint Logic Programming Language Chip," Mathematical and Computer Modelling, vol. 16, No. 1, pp. 95-105 (1992).  
Hwang, J., et al., "2-way vs. D-way Branching for CSP," https://www.cs.sfu.ca/~mitchell/papers/cp05-branching.pdf (accessed on Jan. 28, 2013) (15 pages).  
Peter Van Beek, "Chapter 4. Backtracking Search Algorithms," Handbook of Constraint Programming, Elsevier, vol. 2, pp. 85-134 (2006).

* cited by examiner

*Primary Examiner* — Lut Wong  
(74) *Attorney, Agent, or Firm* — Mark H. Whittenberger, Esq.; Holland & Knight LLP

(57) ABSTRACT

The present disclosure relates to a computer-implemented method for iteratively solving a constraint satisfaction problem. The method may include assigning a value to each of one or more variables associated with the constraint satisfaction problem, each of the one or more variables having a first domain. The method may also include identifying an invalid solution resulting from a first value assigned to a first variable. The method may further include replacing the first value with a second value assigned to the first variable. The method may also include, upon identifying the invalid solution, generating a second domain larger than the first domain.

17 Claims, 3 Drawing Sheets

SYSTEM, METHOD, AND COMPUTER PROGRAM PRODUCT FOR CONSTRAINT SOLVING

FIELD OF THE INVENTION

The present disclosure relates to electronic design automation, and more specifically, to a method for constraint satisfaction.

DISCUSSION OF THE RELATED ART

A Finite-Domain constraint satisfaction problem (CSP) is a problem defined by a set of constraints over variables, where the variables have an initial finite domain of legal values. A solution of a CSP is an assignment of all variables satisfying all the constraints.

Solving constraint satisfaction problems is non-deterministic polynomial-time (NP)-hard. It means that there is no efficient algorithm for the task. All known algorithms for solving general constraint satisfaction problems have exponential worst-case complexity. In practice however, depending on the problem at hand, some algorithms are better than others.

The literature is rich with reporting various search strategies for CSP-solvers. However, all enumerative solvers are based on a DPLL-like strategy that consists of (a) committing to a smaller sub-problem through a choice (of value, sub-domain, etc.), (b) solving the smaller sub-problem, (c) revoking the commitment if solving the sub-problem is not feasible & (d) re-doing the process for an alternative commitment. This process may be repeated until either a solution is found or all alternatives are exhausted. A key component in this approach is the choice of branching strategy. At every branching decision, choosing the right branching strategy may result in a significant gain in search time. The standard practice however, is to use a predefined branching step, typically of setting a single value to a variable. This may often lead to an exhaustive search.

One of the approaches to CSP is a backtracking based search. This approach is proving to be very effective in solving many classes of problems, and is especially eminent in large problems. For example, backtracking based search may work at the word level and not only at the bit level. That is, its set-up time, scales to the number of variables, and not to the number of bits in the problem, which is often a bottleneck in bit-level solvers. One of the countless uses of CSP solving is in generation of a random-directed stimuli in functional verification.

SUMMARY OF INVENTION

In one or more embodiments of the present disclosure, a computer-implemented method for solving a constraint satisfaction problem is provided. The method may include assigning a value to each of one or more variables associated with the constraint satisfaction problem, each of the one or more variables having a first domain. The method may also include identifying an invalid solution resulting from a first value assigned to a first variable. The method may further include replacing the first value with a second value assigned to the first variable. The method may also include, upon identifying the invalid solution, generating a second domain larger than the first domain.

One or more of the following features may be included. In some embodiments, the value may be a set of values. The second domain may be larger than the first domain. In some embodiments, identifying an invalid solution may be based upon, at least in part, a backtracking operation. The constraint satisfaction problem may be associated with the functional verification of an electronic design. The method may further include dividing the second domain until a single value is determined. The method may also include generating a random-directed stimuli associated with the functional verification.

In one or more embodiments of the present disclosure, a system for solving a constraint satisfaction problem is provided. The system may include a computing device having at least one processor configured to assign a value to each of one or more variables associated with the constraint satisfaction problem, each of the one or more variables having a first domain. The at least one processor may be further configured to identify an invalid solution resulting from a first value assigned to a first variable. The at least one processor may be further configured to replace the first value with a second value assigned to the first variable, and upon identifying the invalid solution, the at least one processor may be further configured to generate a second domain larger than the first domain.

One or more of the following features may be included. In some embodiments, the value may be a set of values. The second domain may be larger than the initial finite domain. In some embodiments, identifying an invalid solution may be based upon, at least in part, a backtracking operation. The constraint satisfaction problem may be associated with the functional verification of an electronic design. The method may further include dividing the second domain until a single value is determined. The method may also include generating a random-directed stimuli associated with the functional verification.

In one or more embodiments of the present disclosure a computer-readable storage medium for solving a constraint satisfaction problem is provided. The computer-readable storage medium may include instructions, which when executed by a processor may result in one or more operations. Some operations may include assigning a value to each of one or more variables associated with the constraint satisfaction problem, each of the one or more variables having a first domain. Operations may also include identifying an invalid solution resulting from a first value assigned to a first variable. Operations may further include replacing the first value with a second value assigned to the first variable. Operations may also include, upon identifying the invalid solution, generating a second domain larger than the first domain.

One or more of the following features may be included. In some embodiments, the value may be a set of values. The second domain may be larger than the initial finite domain. In some embodiments, identifying an invalid solution may be based upon, at least in part, a backtracking operation. The constraint satisfaction problem may be associated with the functional verification of an electronic design. Operations may further include dividing the second domain until a single value is determined. Operations may also include generating a random-directed stimuli associated with the functional verification.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
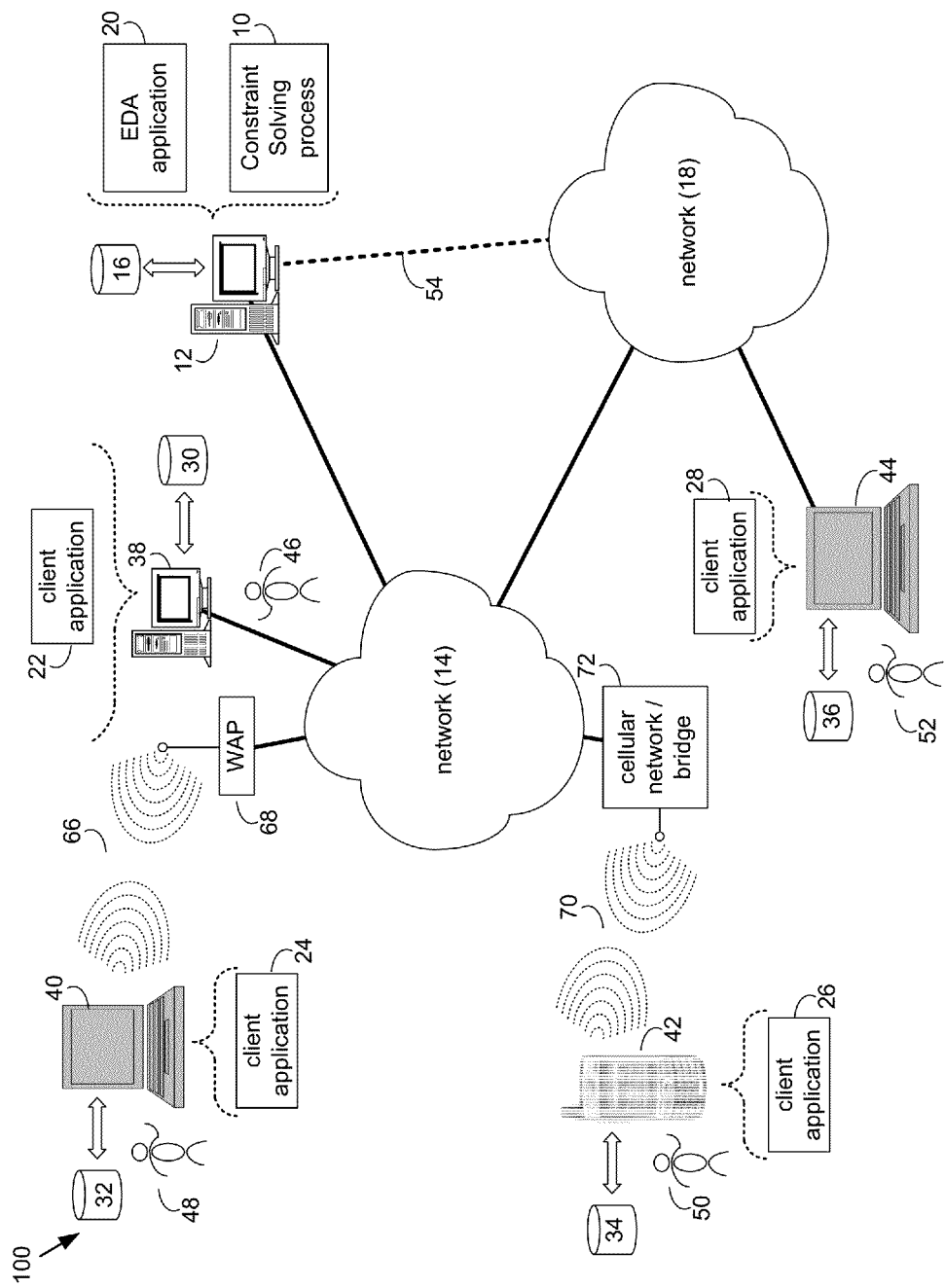
FIG. 1 is a diagram depicting an embodiment of a system in accordance with the present disclosure.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, $C^{++}$ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

One or more hardware description languages may be used in accordance with the present disclosure. Some hardware description languages may include, but are not limited to, Verilog, VHDL, SystemC, SystemVerilog and Verilog-AMS. Various other hardware description languages may also be used as well. It should be noted that aspects of the teachings of the present disclosure may be implemented in an HDL, or in a dedicated Hardware Verification Language (HVL) such as e, Vera or SystemVerilog test bench. In some embodiments, parts may be implemented using an assertion language such as PSL or SystemVerilog assertions (SVA).

Referring to FIG. 1, there is shown constraint solving process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the constraint solving process may reside on and be executed, in whole or in part, by a client electronic device, such as a personal computer, notebook computer, personal digital assistant, or the like.

As will be discussed below in greater detail, constraint solving process 10 may assign (302) a value to each of one or more variables associated with the constraint satisfaction problem, each of the one or more variables having a first domain. Constraint solving process 10 may identify (304) an invalid solution resulting from a first value assigned to a first variable and replace (306) the first value with a second value assigned to the first variable. Upon identifying the invalid solution, constraint solving process 10 may generate (308) a second domain larger than the first domain. Constraint solving process 10 may require one or more iterations prior to generating an appropriate solution. The iterative nature of the process may be applied to any combination of operations described herein.

The instruction sets and subroutines of constraint solving process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization.

Constraint solving process 10 may be a stand alone application, or may be an applet/application/script that may interact with and/or be executed within EDA application 20. In addition/as an alternative to being a server-side process, the constraint solving process may be a client-side process (not shown) that may reside on a client electronic device (described below) and may interact with an EDA client application (e.g., one or more of EDA client applications 22, 24, 26, 28). Further, the constraint solving process may be a hybrid server-side/client-side process that may interact with EDA application 20 and an EDA client application (e.g., one or more of client applications 22, 24, 26, 28). As such, the constraint solving process may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize constraint solving process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both).

Embodiments of constraint solving process 10 described herein may be configured to improve the process of solving constraint satisfaction problems (CSP) through the application of a dynamic splitting search strategy. Some embodiments may include committing, at each search step, to a subset of values in the domain of a search variable. Accordingly, constraint solving process 10 may dynamically increase or decrease the subset in exponential jumps, ensuring the best choice for every step.

Some of the existing techniques for CSP-solvers are based on a Davis-Putnam-Logemann-Loveland ("DPLL")-like strategy that consists of (a) committing to a smaller sub-problem through a choice (of value, sub-domain, etc.), (b) solving the smaller sub-problem, (c) revoking the commitment if solving the sub-problem is not feasible and (d) re-doing the process for an alternative commitment. This process may be repeated until either a solution is found or all alternatives are exhausted.

Embodiments of constraint solving process 10 described herein may utilize one or more of a branching and a splitting technique. The branching-based techniques generally commit to a single value at each forward step of the search algorithm. In contrast, the splitting-based technique may subdivide the domain of a chosen variable and commit to a part of it.

Figure 2:
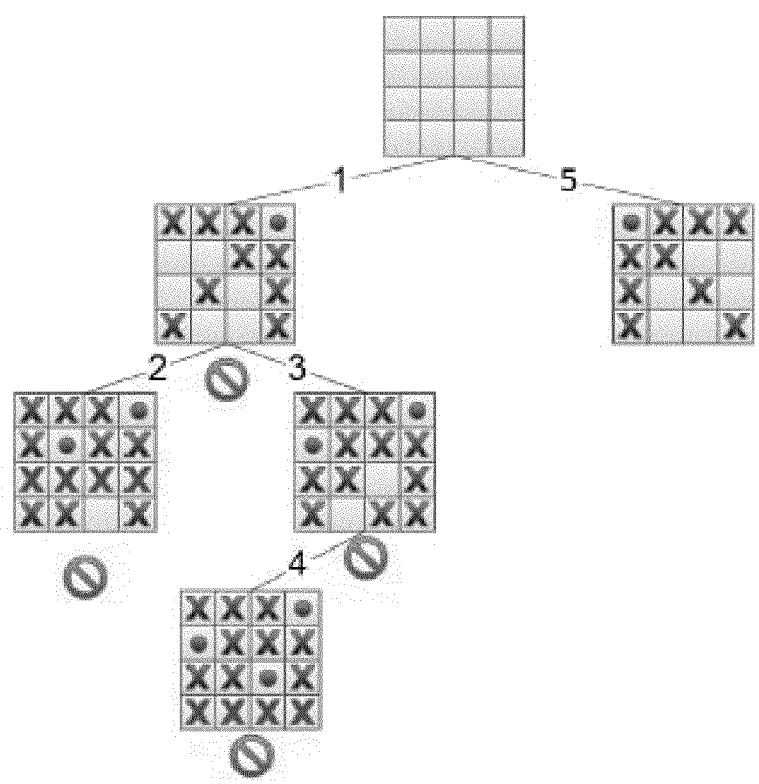
FIG. 2 is a diagram depicting a branch/propagate/backtrack method as applied to a four queens example.
Figure 3:
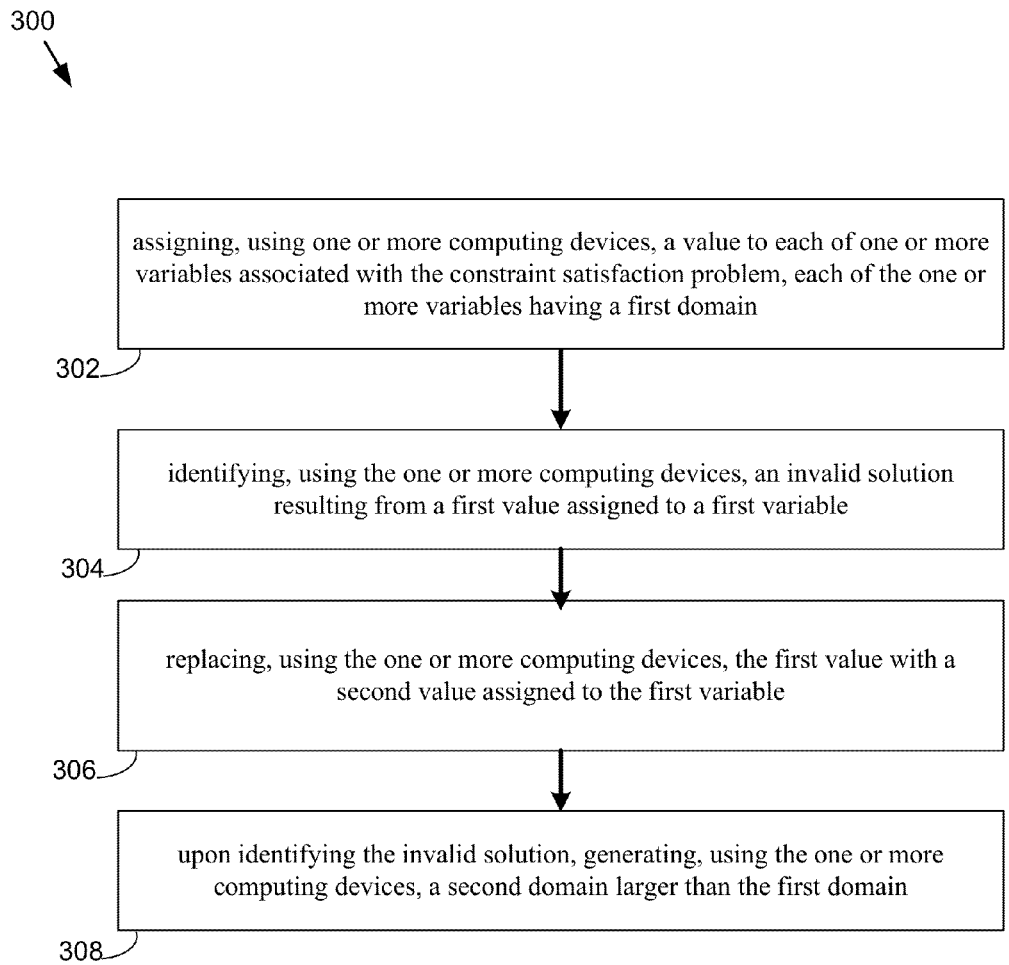
FIG. 3 is a diagram depicting another embodiment of a process in accordance with the present disclosure.

In some embodiments, branching may be viewed as a special case of splitting where domains are divided into a single value and its compliment, and the search commits to that value. Referring now to FIG. 2, an example demonstrating branching on the popular four queens example is provided.

In some embodiments, the splitting method may resemble a binary-search. In each step a variable is being assigned not one, but multiple values. Specifically a set, containing half of the remaining legal values, may be assigned to the variable in question. However, this approach has some limitations, some of which may include, but are not limited to, 1) it weakens the propagation capability, 2) it makes the path to the leaf (a single value), much longer, such that, if a variable's domain is {A . . . Z}, working through this single variable only, requires passing the four assignments of {A . . . N}; {I . . . N}; {I . . . K}; {I} needed to be passed. The Four queens example depicted in FIG. 2 is such an example. Unless a queen commits to a single tile, there will be no meaningful propagation. With the high price, however, sometimes comes a very high payoff. In cases where the propagation succeeds, half of the variable's domain ({A . . . N} in our example) may be eliminated in a single step, which may translate to exponential savings in search time. To demonstrate it, consider the following simple constraint system for integers A, B in range of 0 to 1000:

$$A+B=200$$

$$A=B$$

In this scenario, the branching method will try to assign a single integer value at a time. Every assignment to A or B which is not 100, will result in backtrack, the search can thus be extremely long. With splitting, a typical assignment can be A=[500 . . . 1000], followed by failed propagation (B=[500 . . . 1000]; A+B=[1000 . . . 2000] 6=200), and recommitment to A=[0 . . . 250], etc, until a single value of A=[100] remains, within less than 20 steps.

Embodiments of constraint solving process 10 described herein may utilize an assignment algorithm that works with a single variable at a time. In this way, constraint solving process 10 may adjust by trial and error to the best branching strategy that fits the input problem. Constraint solving process 10 may start with the common assignment steps of assigning a single value to a variable. Accordingly, the solution may be found when the last variable is assigned, and the following propagation succeeds. As long as the simple value assignment works, constraint solving process 10 may advance quickly towards the leaf, and the CSP solution.

In some embodiments, when a backtracking occurs, the value which was assigned to that variable may be removed from the domain, and a new value set is assigned. Upon each backtrack in our approach the new value set may be larger (e.g. twice as large) as the previous assignment to that variable. Consequently, constraint solving process 10 may very quickly reach the situation where a propagation on that variable is successful, instead of exhaustively trying out each of the variable's values in the simple path. Constraint solving process 10 may continue to double the size of the assigned domain each backtrack, as long as the propagation on the domain is effective.

---

Algorithm 1 Dynamic Splitting

```
init: domain size = 1, var = var0;
Dynamic_Splitting(var,domain_size):
    1. var.domain ⊆ var.pick_from_domain(domain_size)
    2. propagate( );
    3. if propagation successful
        (a) if domain_size = 1;
            i. Dynamic_Splitting(next_var,1)
        (b) else
            i. Dynamic_Splitting(var,domain_size/2)
    4. if propagation unsuccessful or recursion backtracked
        (a) restore previous domain, excluding the tried values
        (b) if backtracking_count in recursion ≤ domain_size
            domain_size = domain_size*2;
        (c) goto 1;
```

---

A single value that is consistent with the constraints may still need to be determined, as at this point there is still a set of values. Accordingly, constraint solving process 10 may perform a binary search on that variable, reducing (e.g. halving) the assigned domain, until a single value has been determined. In this way, constraint solving process 10 may combine the single value assignment concept with binary branching.

For example, and as shown above in Algorithm 1, constraint solving process 10 may be configured for solving a constraint satisfaction problem and may include assigning (302) a value to each of one or more variables associated with the constraint satisfaction problem, each of the one or more variables having a first domain. Constraint solving process 10 may further include identifying (304) an invalid solution resulting from a first value assigned to a first variable and replacing (306) the first value with a second value assigned to the first variable. The method may also include identifying an invalid solution resulting from assigning any value to any variable. Upon identifying the invalid solution, constraint solving process 10 may also include generating (308) a second domain is larger than the first domain.

As discussed herein, in some embodiments, the value may be a set of values. Additionally and/or alternatively, the second domain may be twice as large as the initial finite domain. In some embodiments, identifying an invalid solution associated with constraint solving process 10 may be based upon, at least in part, a backtracking operation. The constraint satisfaction problem may be associated with the functional verification of an electronic design. Constraint solving process 10 may further include reducing (e.g. dividing) the second domain until a single value is determined. The method may also include generating a random-directed stimuli associated with the functional verification.

As discussed above, in some embodiments, constraint solving process 10 may be configured to improve the branching strategy of backtracking based CSP solvers. Embodiments disclosed herein may provide an adaptive strategy to split a domain. For example, the branching strategies described herein may provide exponential speed of convergence towards the optimal branch width, in backtracking based search. In this way, the present disclosure includes multiple branching strategies, some of which may include, but are not limited to, the common single value assignment, and halving the values domain.

Embodiments disclosed herein may be used to dynamically, and with exponential speed, adjust the best branching strategy to every branching step. In this way, constraint solving process 10 may allow for the adjustment of the sub-problem size in the branching step. Accordingly, at every branching step, instead of setting a single value to a variable, constraint solving process 10 may utilize a set of values with a varying size.

In some embodiments, constraint solving process 10 may utilize a variable "v" having a finite domain {A . . . Z}. Constraint solving process 10 may include the common branching step of setting a single value to a variable (e.g., v=A). As long as the simple value assignment works, constraint solving process 10 may advance to the next variable. Once all variables are set successfully, the CSP is solved. However, when a backtracking occurs, the value which was assigned to that variable may be removed from the domain (the committed set of values)(e.g., v={B . . . Z}), and a new value should be assigned (v=B).

Upon each backtrack the new domain may be twice as large as the previous assignment to that variable (e.g., v={B . . . C}; v={D . . . G}; . . . ). Consequently, constraint solving process 10 may quickly achieve successful propagation on a variable, or decide that no solution is possible, instead of the exhaustive trying out of the variable's values in the simple path. Constraint solving process 10 may continue the binary search on that variable, halving the assigned domain, until a single value that is consistent with the constraints is reached (e.g., {A . . . N}; {I . . . N}; {I . . . K}; {I}).

In some embodiments, the initial domain may be the largest (e.g., a variable can accept any value between 0 and 100). It may be marked as [0 . . . 100]). Next, a domain may be selected from the initial domain. For example, [5]. If it is not applicable, the second domain will be larger than the first, for example [2 . . . 3].

In one particular implementation, an example of a backtracking based search algorithm may look as follows:
Branch(var):
1. assign_single_value(var)
2. if Propagate( ) and Branch(next_var) Return TRUE else Restore previous state Excluding the tried values if no remaining values Return FALSE else goto 1.
3. end In another particular implementation, an example of pseudo-code associated with constraint solving process 10 may have the following format: DynamicBranch(var,domain_size):
1. assign_domain(var,domain_size)
2. if domain_size==1 next_domain_size=1 //single value branching else next_domain_size=domain_size/2 //halving
3. if Propagate( ) and DynamicBranch (next_var,next_domain_size) Return TRUE Else if propagation unsuccessful or recursion backtracked Restore previous state Excluding the tried values if no remaining values Return FALSE Else if backtracking_count in recursion<=domain_size domain size=domain size*2; //exponential convergence goto 1.
4. end It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for iteratively solving a constraint satisfaction problem associated with the functional verification of an electronic design using dynamic splitting search strategy comprising:
assigning, using one or more computing devices, a value to each of one or more variables associated with the constraint satisfaction problem, each of the one or more variables having a first domain;
identifying, using the one or more computing devices, an invalid solution resulting from a first value assigned to a first variable, wherein upon identifying the invalid solution a backtracking operation is performed;
replacing, using the one or more computing devices, the first value with a second value assigned to the first variable; and
upon identifying the invalid solution, generating, using the one or more computing devices, a second domain larger than the first domain.

2. The computer-implemented method of claim 1, wherein the value is a set of values.

3. The computer-implemented method of claim 2, further comprising:
reducing the second domain until a single value is determined.

4. The computer-implemented method of claim 1, wherein the second domain is twice as large as the first domain.

5. The computer-implemented method of claim 1, wherein identifying an invalid solution is based upon, at least in part, a backtracking operation.

6. The computer-implemented method of claim 1, further comprising:
generating a random-directed stimuli associated with the functional verification.

7. A system for iteratively solving a constraint satisfaction problem associated with the functional verification of an electronic design using dynamic splitting search strategy comprising:
a computing device having at least one processor configured to assign a value to each of one or more variables associated with the constraint satisfaction problem, each of the one or more variables having a first domain, the at least one processor further configured to identify an invalid solution resulting from a first value assigned to a first variable, wherein upon identifying the invalid solution a backtracking operation is performed, the at least one processor further configured to replace the first value with a second value assigned to the first variable, and upon identifying the invalid solution, the at least one processor further configured to generate a second domain larger than the first domain.

8. The system of claim 7, wherein the value is a set of values.

9. The system of claim 8, wherein the at least one processor is configured to reduce the second domain until a single value is determined.

10. The system of claim 7, wherein the second domain is twice as large as the first domain.

11. The system of claim 7, wherein identifying an invalid solution is based upon, at least in part, a backtracking operation.

12. The system of claim 7, wherein the at least one processor is configured to generate a random-directed stimuli associated with the functional verification.

13. A computer-readable storage medium for iteratively solving a constraint satisfaction problem associated with the functional verification of an electronic design using dynamic splitting search strategy, the computer-readable storage medium having stored thereon instructions that when executed by a machine result in one or more operations, the operations comprising:
assigning, using one or more computing devices, a value to each of one or more variables associated with the constraint satisfaction problem, each of the one or more variables having a first domain;
identifying, using the one or more computing devices, an invalid solution resulting from a first value assigned to a first variable, wherein upon identifying the invalid solution a backtracking operation is performed;
replacing, using the one or more computing devices, the first value with a second value assigned to the first variable; and
upon identifying the invalid solution, generating, using the one or more computing devices, a second domain larger than the first domain.

14. The computer-readable storage medium of claim 13, wherein the value is a set of values.

15. The computer-readable storage medium of claim 14, wherein operations further comprise:
reducing the second domain until a single value is determined.

16. The computer-readable storage medium of claim 13, wherein the second domain is twice as large as the first domain.

17. The computer-readable storage medium of claim 13, wherein identifying an invalid solution is based upon, at least in part, a backtracking operation.

* * * * *